(12) United States Patent
Kauffman

(10) Patent No.: US 11,390,326 B2
(45) Date of Patent: Jul. 19, 2022

(54) VEHICLE FRONT BODY STRUCTURE

(71) Applicant: Honda Motor Co., Ltd., Tokyo (JP)

(72) Inventor: Jared S. Kauffman, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 16/893,950

(22) Filed: Jun. 5, 2020

(65) Prior Publication Data

US 2021/0380171 A1 Dec. 9, 2021

(51) Int. Cl.
*B62D 21/15* (2006.01)
*B62D 21/11* (2006.01)
*B62D 21/02* (2006.01)
*B62D 29/00* (2006.01)

(52) U.S. Cl.
CPC .......... *B62D 21/152* (2013.01); *B62D 21/02* (2013.01); *B62D 21/11* (2013.01); *B62D 29/007* (2013.01); *B62D 29/008* (2013.01)

(58) Field of Classification Search
CPC ...... B62D 21/152; B62D 21/02; B62D 21/11; B62D 29/2007; B62D 29/008
See application file for complete search history.

(56) References Cited

U.S. PATENT DOCUMENTS

| | | | |
|---|---|---|---|
| 8,777,300 B2 | 7/2014 | Kim et al. | |
| 9,517,796 B2 | 12/2016 | Balzer et al. | |
| 9,616,937 B2 | 4/2017 | Sasaki | |
| 9,919,745 B2 | 3/2018 | Caillard et al. | |
| 2017/0096169 A1* | 4/2017 | Takeda | B62D 25/145 |
| 2017/0174264 A1 | 6/2017 | Maruyama et al. | |
| 2017/0174265 A1* | 6/2017 | Maruyama | B62D 25/088 |
| 2018/0029643 A1 | 2/2018 | Maruyama et al. | |
| 2018/0029649 A1* | 2/2018 | Maruyama | B62D 21/02 |
| 2020/0062310 A1* | 2/2020 | Wang | B62D 25/2027 |
| 2020/0086921 A1* | 3/2020 | Watanabe | B62D 21/11 |
| 2020/0148270 A1* | 5/2020 | Chung | B62D 25/082 |
| 2020/0307718 A1* | 10/2020 | Kauffman | F16B 5/025 |
| 2021/0016834 A1* | 1/2021 | Moss | B62D 33/044 |

FOREIGN PATENT DOCUMENTS

| | | | |
|---|---|---|---|
| DE | 102012018693 A1 * | 3/2013 | |
| DE | 102013007349 | 10/2014 | |
| DE | 102014211086 | 12/2014 | |

(Continued)

*Primary Examiner* — Lori L Lyjak
(74) *Attorney, Agent, or Firm* — Rankin, Hill & Clark LLP

(57) ABSTRACT

A vehicle front body structure includes a lower side frame member and an upper frame member each extended in a longitudinal direction of the front body structure. The upper frame member is arranged above, in a height direction of the front body structure, and on an outboard side, in a width direction of the front body structure, of the lower side frame member. A damper housing is arranged to connect the lower side frame member and the upper frame member. The damper housing includes an outboard wall, in the width direction, affixed to the upper frame member. The outboard wall includes a deformation relief feature extended in the longitudinal direction along an opening provided on the damper housing for an associated vehicle suspension component.

20 Claims, 4 Drawing Sheets

(56) References Cited

FOREIGN PATENT DOCUMENTS

| | | | |
|---|---|---|---|
| DE | 102017008204 A1 * | 3/2018 | ............. B60R 19/34 |
| EP | 2314500 B1 * | 11/2018 | ............. B62D 21/11 |
| JP | 2017154514 | 9/2017 | |
| RU | 2702209 C2 * | 10/2019 | ............. B22D 17/00 |
| WO | 2016189746 | 12/2016 | |
| WO | WO-2017056872 A1 * | 4/2017 | ............. B62D 21/11 |
| WO | WO-2019192824 A1 * | 10/2019 | ............ B62D 25/082 |

* cited by examiner

VEHICLE FRONT BODY STRUCTURE

BACKGROUND

A vehicle front body structure includes a suspension or damper housing to which a suspension component is attached. In general, the suspension housing is arranged to connect a lower side frame member extended in a vehicle longitudinal direction and an upper frame member extended in the vehicle longitudinal direction and arranged above and on an outward side, in a vehicle width direction, of the lower side frame member. To reduce weight of the front body structure, it is known to provide a die-cast aluminum damper housing, and attach the die-cast aluminum damper housing to the steel lower side and upper frame members with self-piercing rivets. However, this direct connection can interfere with crush characteristics of the front body structure.

BRIEF DESCRIPTION

According to one aspect, a vehicle front body structure comprises a lower side frame member and an upper frame member each extended in a longitudinal direction of the front body structure. The upper frame member is arranged above, in a height direction of the front body structure, and on an outboard side, in a width direction of the front body structure, of the lower side frame member. A damper housing is arranged to connect the lower side frame member and the upper frame member. The damper housing includes an outboard wall, in the width direction, affixed to the upper frame member. The outboard wall includes a deformation relief feature extended in the longitudinal direction along an opening provided on the damper housing for an associated vehicle suspension component.

According to another aspect, a vehicle front body structure comprises a steel lower side frame member and a steel upper frame member each extended in a longitudinal direction of the front body structure. The upper frame member is arranged above, in a height direction of the front body structure, and on an outboard side, in a width direction of the front body structure, of the lower side frame member. A die-cast aluminum damper housing is arranged in a lateral space between the lower side frame member and the upper frame member to connect the lower side frame member and the upper frame member. The damper housing includes a top wall having an opening for an associated vehicle suspension component and an outboard wall, in the width direction, which is affixed to the upper frame member. The upper frame member includes a crash deformation feature for the front body structure and the outboard wall includes a deformation relief feature aligned in the longitudinal direction with the crash deformation feature. The deformation relief feature is configured to limit inward reinforcement, in the width direction, of the upper frame member by the outboard wall of the damper housing.

According to another aspect, a vehicle front body structure comprises a steel lower side frame member and a steel upper frame member each extended in a longitudinal direction of the front body structure. The upper frame member is arranged above, in a height direction of the front body structure, and on an outboard side, in a width direction of the front body structure, of the lower side frame member. A die-cast aluminum damper housing is arranged in a lateral space between the lower side frame member and the upper frame member to connect the lower side frame member and the upper frame member. The damper housing includes a top wall having an opening for an associated vehicle suspension component and an outboard wall, in the width direction, which is affixed to the upper frame member. An inboard wall, in the width direction, of the upper frame member includes an outwardly bent section defined as a crash deformation feature for the front body structure. The outboard wall of the damper housing includes a cutout aligned in the longitudinal direction with the bent section to limit inward reinforcement, in the width direction, of the bent section by the outboard wall of the damper housing.

DETAILED DESCRIPTION

Figure 1:
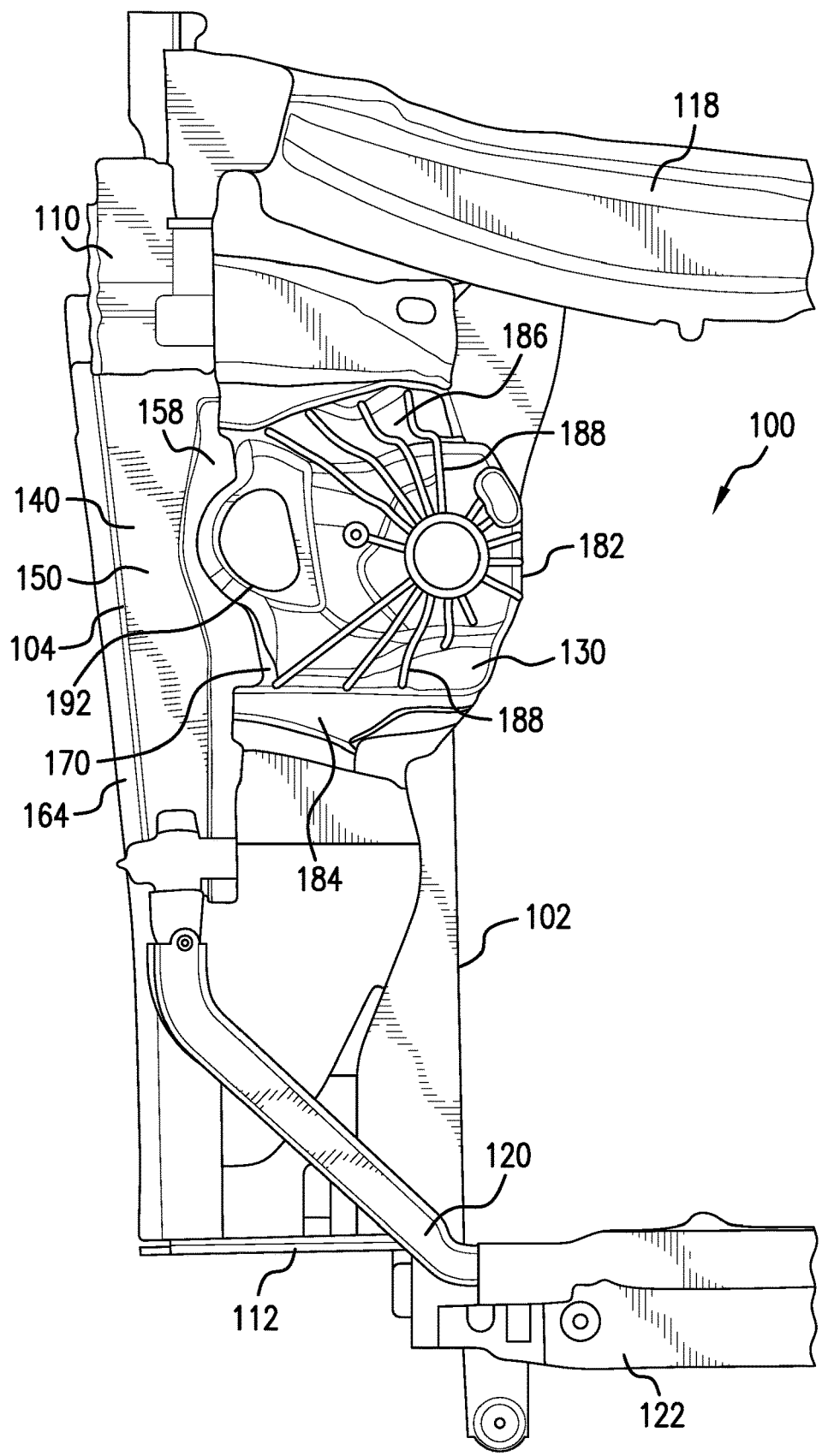
FIG. 1 is a partial top perspective view of a left side of a vehicle front body structure according to the present disclosure.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-4 illustrate a left side of a vehicle front body structure 100 according to the present disclosure. The front body structure 100 generally comprises a left lower side frame member 102 extended in a longitudinal direction of the front body structure. A rear end of the left lower side frame member 102 is joined to an unillustrated dashboard lower cross-member extended in a width direction of the front body structure, and also to a front edge of an unillustrated front floor frame extended in the longitudinal direction. A left upper frame member 104 extended in the longitudinal direction is arranged above, in a height direction of the front body structure, and on an outboard side, in the width direction of the front body structure, of the left lower side frame member 102. The left upper frame member 104 is curved downward toward the front of the front body structure 100 in such a manner that a front end of the left upper frame member 104 extends to a location positioned on the outboard side of a front end of the left lower side frame member 102. Further depicted is a left joint panel 110 which constitutes a rear part of the left upper frame member 104. The respective front ends of the left lower side frame member 102 and left upper frame member 104 are joined through a coupling member 112. A rear end of the left upper frame member 9 can be joined to a cowl 118 extended in the width direction. In FIG. 1, a front bulkhead upper member 120 is coupled to the left upper frame member 104. A front bulkhead lower member 122 is joined to the front bulkhead upper member 120 to form a radiator housing part. Further, an exemplary left damper housing 130 supporting a suspension component (for example, a damper) of an unillustrated front suspension is arranged in a lateral space between the left lower side frame member 102 and left upper frame member 104 to further connect the left lower side frame member 102 and the left upper frame member 104.

It should be appreciated that a right side of the front body structure 100 may be identically constructed as the above described left side, but for its disposition on the opposite side of the front body structure. To simplify the explanation of the present disclosure, only the left side construction will be discussed, and the term "left" will be further omitted for ease of explanation (for example, left lower side frame member 102 will be referred to as lower side frame member 102). In the present disclosure, the lower side frame member 102 and the upper frame member 104 can be formed of a steel material, and the damper housing 130 is a die-cast aluminum damper housing to be fastened (e.g., riveted) to the lower side frame member and the upper frame member.

Figure 2:
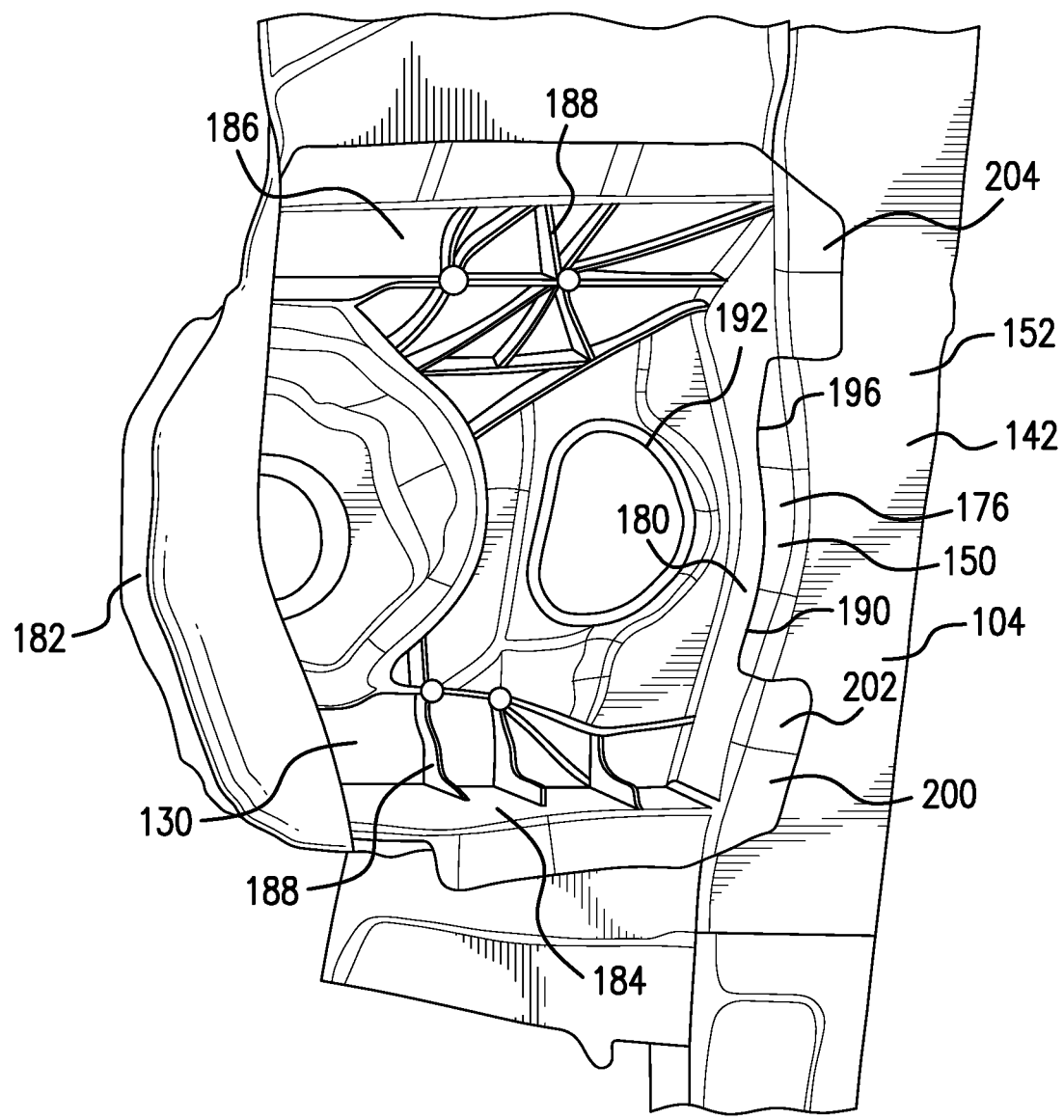
FIG. 2 is a partial bottom perspective view of the front body structure of FIG.
Figure 3:
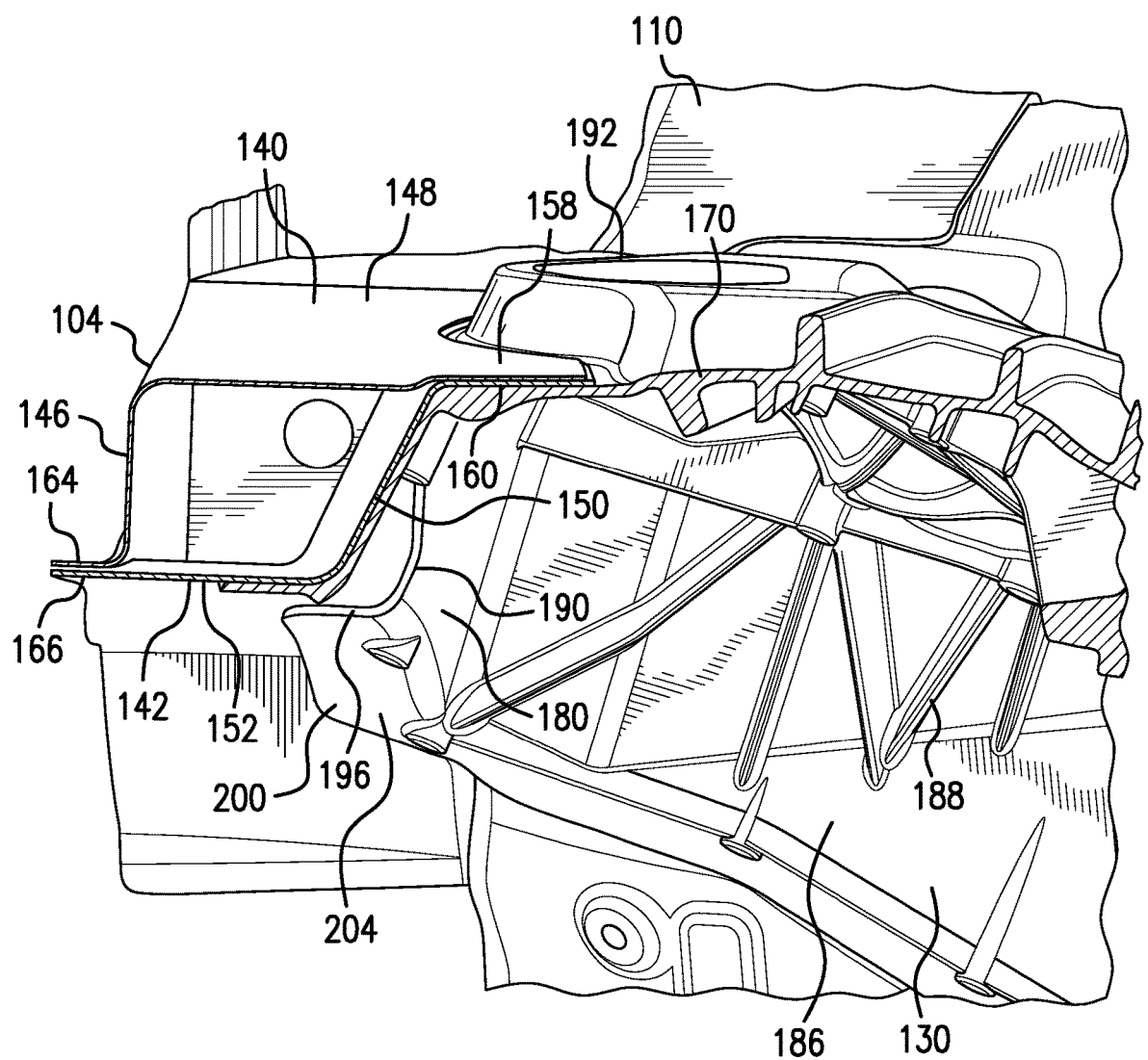
FIGS. 3 and 4 are partial cross-sectional views of the front body structure of FIG. 1.
Figure 4:
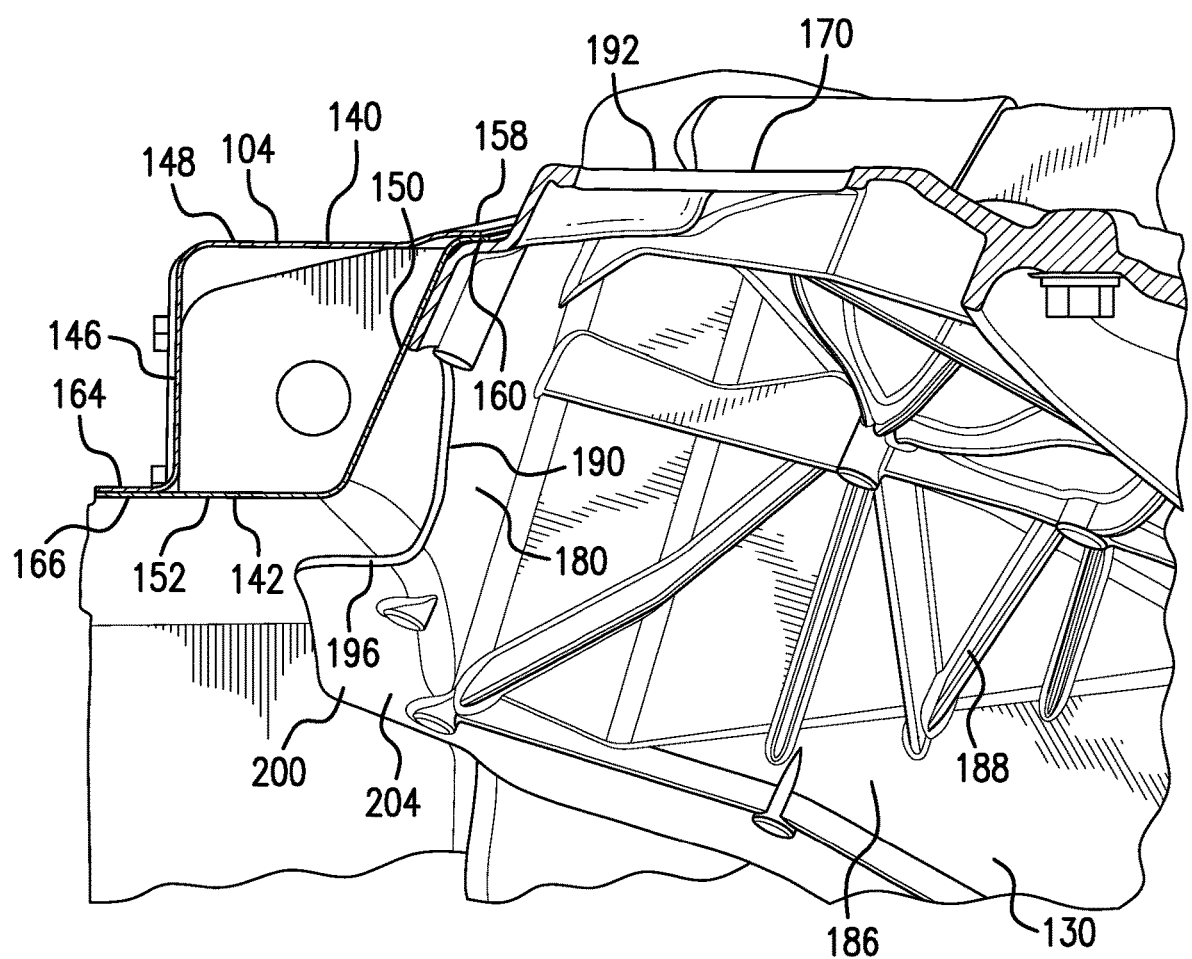

In the depicted aspect of FIGS. 3 and 4, the upper frame member 104 includes an upper section 140 and a lower section 142, relative to a height direction of the front body structure 100. The upper section 140 has an outboard wall 146, in the width direction, and an upper wall 148, and the lower section has an inboard wall 150, in the width direction, and a lower wall 152. The upper wall 148 includes a flange structure 158 to be affixed in an overlapping manner to a flange structure 160 of the inboard wall 150. The outboard wall 146 includes a flange structure 164 to be affixed in an overlapping manner to a flange structure 166 of the lower wall 152. The overlapping flange structures 158, 160 are secured to a top wall 170 of the damper housing 130. As best depicted in FIG. 2, a section of the inboard wall 150 of the upper frame member 104 aligned with the damper housing 130 is budged or curved outwardly toward the outward wall 146 to define an outwardly bent section 176 having a reduced width dimension as compared to the remaining upper frame member 104. The bent section 176 is adapted as a crash deformation feature (i.e., a weakened section) of the front body structure 100, and is configured in such a manner that when a load is applied to the upper frame member 104 along the longitudinal direction, a stress is concentrated on this bent section 176.

According to the present disclosure, the damper housing 130 is configured to limit interference with the above crash deformation feature. The damper housing 130 includes the top wall 170, outboard and inboard walls 180, 182, in the width direction, and longitudinal spaced side walls 184, 186. A plurality of strengthening ribs 188 integral with the damper housing 130 can extend from the top wall 170 to at least the side walls 184, 186. The outboard wall 180 is directly affixed to the inboard wall 150 of the upper frame member 104. According to the present embodiment, an intermediate section of the outboard wall 180 includes a deformation relief feature 190 associated with the crash deformation feature. The deformation relief feature 190 is extended in the longitudinal direction along an opening 192 provided on the top wall 170 of the damper housing 130 for the suspension component. In the depicted aspect, the bent section 176 is aligned in the longitudinal direction with the opening 192 of the damper housing 130, and the deformation relief feature 190 is aligned in the longitudinal direction with the bent section 176. The deformation relief feature 190 is configured to limit both inward reinforcement, in the width direction, and longitudinal reinforcement of the bent section 176 by the outboard wall 180 of the damper housing 130. As shown, the deformation relief feature 190 is defined as cutout 196 provided in the outboard wall 180. In a side view of the outboard wall, the cutout can have an inverted U-shape. The cutout 196 can be dimensioned to extend a majority of a height of the outboard wall 180, and the cutout 196 can be elongated a majority of a length of the outboard wall 180. Further, in a side view, the cutout 196 can have a length dimension greater than a length dimension of the opening 192 in the top wall 170 for the suspension component.

In FIGS. 2-4, the outboard wall 180 includes a mounting flange 200 that is directly affixed to an underside of the upper frame member 104, specifically the lower wall 152 of the lower section 142. The cutout 196 of the deformation relief feature 190 extends onto and through the mounting flange 200 to separate the mounting flange into first and second flange sections 202, 204 which are spaced to flank the bent section 176 in the longitudinal direction. With the mounting flange 200 separated by the cutout 196, the mounting flange is not directly affixed to the bent section 176 and the bent section is not reinforced by the mounting flange 200. To reinforce the intermediate section of the outboard wall 180 having the cutout 196, the overlapping flange structures 158, 160 of the upper frame member 104 that are secured to the top wall 170 of the damper housing 170 are also extended in the longitudinal direction over the cutout 196 on the outboard wall 180.

Accordingly, the die-cast aluminum damper housing 130 is attached to the steel upper frame member 104. The deformation relief feature 190 is provided extended along the outboard wall 180 of the damper housing 130. The deformation relief feature 190 is defined by the cutout 196 extending through the outboard wall 180 and its mounting flange 200, and the cutout 196 is sized to provide an area necessary to maintain the connection between the damper housing 130 and the upper frame member 104. The deformation relief feature 190 also prevents the reinforcement of the crash deformation feature (i.e., bent section 176) of the upper frame member 104 so that the damper housing 130 does not substantially interfere with the crush characteristic of the vehicle front body structure 100.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle front body structure comprising:
a lower side frame member extended in a longitudinal direction of the front body structure;
an upper frame member extended in the longitudinal direction and arranged above, in a height direction of the front body structure, and on an outboard side, in a width direction of the front body structure, of the lower side frame member; and
a damper housing arranged to connect the lower side frame member and the upper frame member, the damper housing includes an outboard wall, in the width direction, affixed to the upper frame member, the outboard wall includes a deformation relief feature extended in the longitudinal direction along an opening provided on the damper housing for an associated vehicle suspension component.

2. The vehicle front body structure of claim 1, wherein the upper frame member includes an outwardly bent section adapted as a crash deformation feature of the front body structure, and the deformation relief feature is aligned in the longitudinal direction with the bent section.

3. The vehicle front body structure of claim 2, wherein the bent section is aligned in the longitudinal direction with the opening of the damper housing and is provided on an inboard wall, in the width direction, of the upper fame member.

4. The vehicle front body structure of claim 2, wherein the outboard wall includes a mounting flange that is affixed to an underside of the upper frame member, the deformation relief feature extends onto the mounting flange to separate the mounting flange into first and second flange sections which flank the bent section in the longitudinal direction.

5. The vehicle front body structure of claim 4, wherein in a side view of the outboard wall, the deformation relief feature is defined as an inverted U-shaped cutout provided on the outboard wall.

6. The vehicle front body structure of claim 5, wherein the cutout extends through the mounting flange so that the mounting flange is not directly affixed to the bent section and the bent section is not reinforced by the mounting flange.

7. The vehicle front body structure of claim 5, wherein the upper frame member includes an upper section having an upper flange structure and a separate lower section having a lower flange structure overlapping and affixed to the upper flange structure, the overlapping affixed upper and lower flange structures secured to a top wall of the damper housing and extended in the longitudinal direction over the cutout on the outboard wall.

8. The vehicle front body structure of claim 2, wherein the deformation relief feature is configured to limit inward reinforcement, in the width direction, of the bent section by the outboard wall of the damper housing.

9. The vehicle front body structure of claim 1, wherein the deformation relief feature is provided as a cutout in a lower portion of the outboard wall, the cutout is elongated a majority of a length of the outboard wall and has a length dimension greater than a length dimension of the opening.

10. A vehicle front body structure comprising:
a steel lower side frame member extended in a longitudinal direction of the front body structure;
a steel upper frame member extended in the longitudinal direction and arranged above, in a height direction of the front body structure, and on an outboard side, in a width direction of the front body structure, of the lower side frame member; and
a die-cast aluminum damper housing arranged in a lateral space between the lower side frame member and the upper frame member to connect the lower side frame member and the upper frame member, the damper housing includes a top wall and an outboard wall, the top wall has an opening for an associated vehicle suspension component, the outboard wall, in the width direction, is affixed to the upper frame member,
wherein the upper frame member includes a crash deformation feature for the front body structure and the outboard wall includes a deformation relief feature aligned in the longitudinal direction with the crash deformation feature, the deformation relief feature is configured to limit inward reinforcement, in the width direction, of the upper frame member by the outboard wall of the damper housing.

11. The vehicle front body structure of claim 10, wherein the crash deformation feature is defined by an outwardly bent section on an inboard wall, in the width direction, of the upper frame member.

12. The vehicle front body structure of claim 11, wherein the bent section is aligned in the longitudinal direction with the opening of the damper housing.

13. The vehicle front body structure of claim 11, wherein the outboard wall includes a mounting flange that is affixed to an underside of the upper frame member, the deformation relief feature extends onto the mounting flange to separate the mounting flange into first and second flange sections which flank the bent section in the longitudinal direction.

14. The vehicle front body structure of claim 13, wherein in a side view of the outboard wall, the deformation relief feature is defined as an inverted U-shaped cutout provided on the outboard wall, the cutout extends through the mounting flange so that the mounting flange is not affixed to the bent section and the bent section is not reinforced by the mounting flange.

15. The vehicle front body structure of claim 14, wherein the upper frame member includes an upper section having an upper flange structure and a separate lower section having a lower flange structure overlapping and affixed to the upper flange structure, the overlapping affixed upper and lower flange structures secured to a top wall of the damper housing and extended in the longitudinal direction over the cutout on the outboard wall.

16. The vehicle front body structure of claim 11, wherein the deformation relief feature is provided as a cutout in the outboard wall, the cutout extends a majority of a height of the outboard wall, the cutout is elongated a majority of a length of the outboard wall, and the cutout has a length dimension greater than a length dimension of the opening.

17. A vehicle front body structure comprising:
a steel lower side frame member extended in a longitudinal direction of the front body structure;
a steel upper frame member extended in the longitudinal direction and arranged above, in a height direction of the front body structure, and on an outboard side, in a width direction of the front body structure, of the lower side frame member; and
a die-cast aluminum damper housing arranged in a lateral space between the lower side frame member and the upper frame member to connect the lower side frame member and the upper frame member, the damper housing includes a top wall and an outboard wall, the top wall has an opening for an associated vehicle suspension component, the outboard wall, in the width direction, is affixed to the upper frame member,
wherein an inboard wall, in the width direction, of the upper frame member includes an outwardly bent section defined as a crash deformation feature for the front body structure,
wherein the outboard wall of the damper housing includes a cutout aligned in the longitudinal direction with the bent section to limit inward reinforcement, in the width direction, of the bent section by the outboard wall of the damper housing.

18. The vehicle front body structure of claim 17, wherein the outboard wall includes a mounting flange that is affixed to an underside of the upper frame member, the cutout extends through the mounting flange to separate the mounting flange into first and second flange sections which flank the bent section in the longitudinal direction.

19. The vehicle front body structure of claim 18, wherein the cutout has an inverted U-shape in a side view of the outboard wall.

20. The vehicle front body structure of claim 17, wherein the bent section is aligned in the longitudinal direction with the opening of the damper housing.

* * * * *